United States Patent

Haase et al.

[11] Patent Number: 5,879,795
[45] Date of Patent: Mar. 9, 1999

[54] LUMINESCENT SCREEN CONTAINING PHOSPHOR PARTICLES COATED WITH MOO₃

[75] Inventors: Markus Haase, Aachen; Helmut Bechtel, Roetgen; Wolfram Czarnojan; Joseph Lauter, both of Aachen, all of Germany

[73] Assignee: U.S. Philips Corporation, New York, N.Y.

[21] Appl. No.: 570,449

[22] Filed: Dec. 11, 1995

[30] Foreign Application Priority Data

Dec. 16, 1994 [DE] Germany .......................... 44 44 872.4

[51] Int. Cl.⁶ ........................................................ B32B 5/16
[52] U.S. Cl. ........................ 428/323; 428/328; 428/403; 428/917
[58] Field of Search ..................... 428/323, 403, 428/917, 328

[56] References Cited

U.S. PATENT DOCUMENTS

| | | | |
|---|---|---|---|
| 3,690,929 | 9/1972 | Yokota et al. ..................... | 117/100 B |
| 4,209,705 | 6/1980 | Washida et al. ......................... | 250/486 |
| 4,692,256 | 9/1987 | Umemura et al. ..................... | 252/32.7 |
| 4,757,234 | 7/1988 | Ikuta et al. .............................. | 313/496 |
| 4,845,407 | 7/1989 | Ikuta ....................................... | 315/169 |
| 5,460,980 | 10/1995 | Tran et al. ................................ | 437/2 |

FOREIGN PATENT DOCUMENTS

| | | | |
|---|---|---|---|
| 587123A2 | 3/1994 | European Pat. Off. ......... | H01J 29/28 |
| 1525036 | 10/1968 | France . | |
| 326781 | 5/1991 | Japan .............................. | C09K 11/08 |

*Primary Examiner*—Hoa T. Le
*Attorney, Agent, or Firm*—Norman N. Spain

[57] ABSTRACT

The invention relates to a display screen comprising a phosphor composition of a sulphide and/or selenide-containing phosphor which is provided with a coating which comprises molybdenum (VI)-trioxide. In such display screens, the advantages of the efficient sulphide or selenide-containing phosphors can be used and said display screens remain bright and rich in contrast for a long period of time because the coating, which comprises molybdenum (VI)-trioxide, surprisingly acts as a stabilizing protective coating which limits the corrosion processes in sulphide and/or selenide-containing phosphors induced by low-energy radiation.

4 Claims, No Drawings

LUMINESCENT SCREEN CONTAINING PHOSPHOR PARTICLES COATED WITH $MOO_3$

BACKGROUND OF THE INVENTION

The invention relates to a display screen, especially a flat-panel display screen such as a low-energy cathode ray display screen, which comprises a phosphor composition of a sulphide or selenide-containing phosphor which is provided with a coating.

The trend towards flat-panel display screens has led to low-energy cathode ray display screens which constitute a new development in the field of luminescent-display devices. Flat-panel display screens were developed for three market segments, i.e. office automation, audio/video technology and navigation and entertainment. In the field of office automation reference must be made, in particular, to mobile applications which range from the Notebook Computer, Personal Digital Assistant, fax machine to the mobile telephone. In the field of audio/video, the flat-panel display screens are intended not only for use in camcorders but also in television receivers and monitors. The third field of application comprises flat-panel display screens which are to be used as monitors for navigation systems in cars and aircraft, but also as display screens for electronic games.

In the case of flat-panel display screens, geometric and other aspects have led to a reduction of the maximum accelerating voltage to values which are much lower than in customary cathode ray display screens. As, on the other hand, the picture brightness and energy efficiency of the display screen decreases as the accelerating voltage decreases, said accelerating voltage must not be reduced too much. Low-energy cathode ray display screens are therefore operated at accelerating voltages in the range from approximately 1 to 10 kV. Said accelerating voltages are clearly below those of customary cathode ray display screens, which are operated at a voltage of typically 25–35 kV; however, they are clearly above the accelerating voltage of vacuum fluorescent display screens, which are operated at approximately 0.01 to 0.3 kV.

Phosphors for cathode ray display screens, also when they are of the conventional type, are customarily subjected to a surface treatment so that they can more adequately meet the requirements.

One of the requirements to be met is that the phosphor powders should be readily dispersable in dispersion solutions used in the photolithographic manufacturing processes for display screens. For this purpose, surface coatings are developed which yield free-flowing powders from which stable dispersions can be made in a simple manner.

A further aspect in the development of coatings is the protection against the aggressive chemicals used in the photolithographic manufacturing processes. Particularly in the customarily used "flow coating" process in which dichromates are applied, unprotected phosphors are subject to chemical attack.

Further requirements to be met by phosphors relate to the colour quality. This is the reason why in the so-called "pigmented" phosphors the coating of dispersing aids is replaced by or combined with a second type of coating whose main constituents are colour particles. Said colour particles reduce the reflection of ambient light from the phosphor grains and hence increase the contrast of the image depicted on the display screen. In the case of phosphors whose chromatic values deviate from the standard, said colour particles additionally serve as colour filters which bring the chromatic values in conformity with said standard.

Functionally different coatings are used in the case of phosphors for vacuum fluorescent display screens in which excitation takes place by means of low-energy electrons of several tens of volts to maximally several hundred volts. In this case, charging effects during excitation of the phosphors, which adversely affect the excitation efficiency, must be precluded. Coatings for phosphor powders for vacuum fluorescent display screens are therefore composed of conductivity-improving materials such as indium tin oxide, fine metal powders and such.

It is for example known from JP 3-26781 (A) to provide the surface of fluorescent substances with a complex, electroconductive coating which is preferably composed of 0.1–15 wt. % of complex, electroconductive particles which are manufactured by providing electroconductive, fine particles, which preferably have an average particle diameter of 1.0001–0.1 $\mu$m and which comprise one or more elements selected from the group formed by Al, Au, Ag or Cu, on the surface of large electroconductive particles which have an average particle diameter, preferably, of 0.01–1 $\mu$m, and which comprise one or more compounds of the group formed by $SnO_2$, $Sb_2O_3$, ZnO, $In_2O_3$, $TiO_2$, $Bi_2O_3$, CdS or $MoO_3$.

However, phosphors used for low-energy cathode ray display screens must meet entirely new requirements. In order to achieve a good picture brightness in spite of the low exciting voltage, these display screens must be operated at high currents. To ensure that the necessary current does not increase to impracticably high values, use must simultaneously be made of phosphors having a high efficiency. Even if the architecture of the display screen permits extremely high current values, the low efficiency of a phosphor cannot be compensated for at will by increasing the current value because, after increasing linearly with the current intensity, the luminous intensity of the phosphor finally attains a saturation value. The current intensity at which this saturation value is attained depends upon the type of phosphor used and on how it must be prepared.

Therefore, it is very important for low-energy cathode ray display screens that the phosphors used exhibit a high efficiency and that they reach said saturation value only at high current intensities. The condition of a high efficiency at a sufficiently high saturation value is fulfilled by only very few phosphors, in particular by sulphide-containing phosphors and selenide-containing phosphors such as ZnS:Ag, ZnS:Cu, ZnCdSe:Ag and such.

However, under the excitation conditions in low-energy cathode ray display screens, said sulphide and/or selenide-containing phosphors are very rapidly degraded, i.e. the bombardment with low-energy electrons leads to an accelerated reduction of the luminous intensity and efficiency of the phosphor. Probably the low penetration depth of the low-energy electrons causes the radiation-induced reactions to be concentrated and intensified in the surface layers of the phosphor grains.

In conventionally coated display screens, which are excited by low-energy cathode rays, a rapid reduction in brightness is observed. In coloured display screens, in which customarily three different phosphors are used, this additionally leads to a slow change of the chromatic values of all mixed colours when each one of the phosphors used does not degrade at an equal rate.

However, commercial low-energy cathode ray display screens, for example color television receivers having a flat display screen should produce images having a constant brightness and pure chromatic values for several thousand hours of operation.

SUMMARY OF THE INVENTION

It is an object of the invention to provide a display screen comprising a phosphor composition of a sulphide and/or selenide-containing phosphor with a coating, which composition does not degrade when it is excited by electrons of approximately 1 to 10 kV.

This object is achieved in accordance with the invention by a display screen comprising a phosphor composition of a sulphide and/or selenide-containing phosphor which is provided with a coating which comprises molybdenum (VI) trioxide.

In such display screens, the advantages of the efficient sulphide and/or selenide-containing phosphors can be used and said display screen remains bright and rich in contrast for a long period of time, while the coating, which comprises molybdenum (VI)-trioxide, surprisingly acts as a stabilizing protective coating which limits the corrosion processes in sulphide and/or selenide-containing phosphors induced by low-energy radiation.

Stoichiometric trioxide of molybdenum (VI) does not react with the sulphidic or selenide-containing substrates. It is not even degraded by radiation. The white oxide does not influence the chromatic values of the phosphors. This oxide is hydrophillic, so that the coated particles can be easily dispersed.

Within the scope of the invention, it may also be preferred that the phosphor coated in accordance with the invention has a covering layer of a dispersing aid.

The inventive coating per se is abrasion-resistant, so that the coated phosphor as such can be transported and used. Customarily, however, phosphor powders are provided with a covering layer of a dispersing aid for ease of handling. It has been found that dispersing aids, in particular those which comprise surface-bonded hydroxyl groups, such as $SiO_2$, further promote ageing of the phosphors, thus, it is particularly advantageous to protect a sulphide or selenide-containing phosphor, having a covering layer of a dispersing aid such as $SiO_2$, by a stabilizing intermediate layer of molybdenum (VI) trioxide.

For the same reason, combining a sulphide and/or selenide-containing phosphor having a stabilizing coating of molybdenum (VI)-trioxide with a covering layer which comprises pigments, particularly those having surface-bonded hydroxyl groups, is particularly preferred.

To manufacture a coating for a sulphide and/or selenide-containing phosphor, which coating comprises molybdenum (VI)-trioxide, in a first step, molybdenum blue is precipitated from an acidified solution of one or more soluble molybdates on the sulphide-containing phosphor by a reaction with said phosphor and, in a second step, said molybdenum blue is oxidized to molybdenum (VI)-trioxide.

This method allows a controlled reaction between the sulphide and/or selenide-containing substrate and the molybdate-containing solution to take place, because the reaction continues as long as the surface of the phosphor particles is not completely coated and stops as soon as the coated state is attained.

It may be preferred that the acidified molybdate solution comprises phosphoric acid. The addition of phosphoric acid increases the solubility of the molybdates and promotes the formation of a thin and uniform coating.

These and other aspects of the invention will be apparent from and elucidated with reference to the embodiments described hereinafter.

The sulphide and/or selenide-containing phosphors, which are provided with a stabilizing coating in accordance with the invention, are in the first place phosphors on the basis of ZnS, such as ZnS:Ag, ZnS:Cu, ZnS:Mn and such. In accordance with the invention, it is further possible to stabilize phosphors on the basis of cadmium sulphide, zinc cadmium sulphide and zinc sulphide selenide having a selenide content of maximally 20 mol %.

These phosphor substrates can take the form of primary particles or of granulates mixed with pigment and binders. The grain size of the phosphor particles is not critical. The primary grain size of commercially available phosphors ranges approximately from 2 to 20 $\mu$m.

These substrate particles are covered with a thin and uniform layer of $MoO_3$. The layer thickness customarily ranges from 0.001 to 0.2 $\mu$m and, as it is so thin, penetration of electrons takes place without an appreciable loss of energy.

The coating may additionally comprise organic or inorganic binders, such as latex, methyl cellulose or aluminium phosphates and $SiO_2$, to further improve the density of the coating and to limit the possibility of chemical attacks on the substrate.

Soluble molybdates, such as ammonium orthomolybdate $(NH_4)_2MoO_4$, sodium orthomolybdate $Na_2MoO_4$ aq, ammonium heptamolybdate $(NH_4)_6Mo_7O_{24}$ aq, sodium heptamolybdate $Na_6Mo_7O_{24}$ aq and similar compounds are used as the starting compounds for the coating.

To manufacture the coating solution, said molybdenum compounds are individually or jointly dissolved in diluted hydrochloric acid having a molarity of 0.1–1. The concentration of the molybdates in the hydrochloric solution may range from 0.5 to 15 wt. % (relative to $MoO_3$).

The coating solution may additionally comprise up to 0.1 mol phosphoric acid per mol molybdenum compound.

The pH-value of the coating solution must be $\leq 4$. An even lower pH-value, i.e. between 0 and 1, causes the reaction to take place more rapidly.

The phosphor to be coated is dispersed in this solution. The reaction with the sulphide or selenide-containing phosphor causes the deep blue, colloidal, substoichiometric oxides of the molybdenum ("molybdenum blue") to be precipitated on the surface of the phosphor particles. As a result of the deep blue colour of the precipitate of these oxides, the phosphor obtains a more or less intense blue color.

The deep blue color of the molybdenum blue can be attributed to the concurrence of molybdenum (VI) and lower oxidation steps (valency-mixed compounds); the exact composition is not defined.

This suspension is stirred for 1–5 hours to irreversibly age the colloidal oxides. Subsequently, the coated phosphor is separated from the excess of coating solution, whereafter it is washed with a washing liquid, for example alcohol/water, and dried.

Next, the coated phosphor is subjected to an oxidizing post-treatment in which the intensely colored substoichiometric molybdenum oxides are converted to colorless trioxide. To this end, the phosphor pre-treated as described hereinabove is treated in an oxygen-containing atmosphere at a temperature of 400° C. to 500° C. for 0.5 to 2 hours or until the blue color has disappeared. If the pH-value is very low, the reaction can be accelerated by forming a small quantity of dark brown molybdenum disulphide. This does not have a disturbing effect, since also molybdenum disulphide is converted to molybdenum (VI) oxide in the oxidative aftertreatment.

By virtue of this oxidative treatment, a mechanically and chemically very resistant coating is obtained which adheres well to the substrate. The coating thus produced has a thickness of approximately 15 nm. By means of ESCA measurements it can be determined that the coating completely covers the phosphor substrates, although it is not essential to the invention that the coating tightly encloses the substrate particles.

The coating is hydrophillic and compatible with the customary coatings, so that it can suitably be used as the base layer for further coatings which may be subsequently provided to improve the powder properties or chromatic values of the material.

Molybdenum oxide does not demonstrate competitive absorption. The coating itself does not show any signs of degradation. ALT tests show that, all in all, the life of the material is increased by a factor of 5–10 due to the coating. It is particularly advantageous if the coating additionally comprises $SiO_2$. This $SiO_2$ coating may be applied in the form of a mixture with the molybdenum coating, or it can be separately provided as a covering layer on this coating.

Exemplary Embodiment 1

A quantity of 176 g ammonium heptamolybdate-4-hydrate are stirred into 1000 ml water and brought into solution by adding 9000 ml 1-molar hydrochloric acid. A quantity of 1000 g ZnS:Ag phosphor are stirred into said solution and dispersed by means of ultrasound. The vessel is closed and the suspension stirred for another 2.5 h. Subsequently, the phosphor particles which are now blue in colour are centrifuged off, washed several times with, in succession, 0.1-molar hydrochloric acid, alcohol and water, and then dried to constant weight.

To oxidize the coating, the phosphor composition is applied in a thin layer in a ventilated muffle furnace. Said phosphor composition is heated to 450° C. at a heating rate of 200° C./h, maintained at 450° C. for 1 hour and then cooled according to the natural furnace curve.

Exemplary Embodiment 2

A quantity of 242 g $Na_2MoO_4.2H_2O$ are stirred into 1000 ml water and brought into solution by adding 9000 ml 0.6-molar hydrochloric acid. A quantity of 1000 g ZnCdS:Ag phosphor are stirred into the solution and dispersed by means of ultrasound. The vessel is closed and the suspension is stirred for another 2.5 h. Subsequently, the phosphor particles which are now blue in color are centrifuged off, washed several times with, in succession, 0.1-molar hydrochloric acid, alcohol and water, and then dried to constant weight.

To oxidize the coating, the phosphor composition is applied in the form of a thin layer in a ventilated muffle furnace. Said phosphor composition is heated to 450° C. at a rate of 200° C./h, maintained at 450° C. for 1 h and then cooled according to the natural furnace curve.

Exemplary Embodiment 3

A quantity of 242 g $Na_2MoO_4.2H_2O$ are stirred into 1000 ml water and brought into solution by adding 9000 ml 0.6-molar hydrochloric acid. A quantity of 1000 g ZnS:Cu phosphor are stirred into said solution and dispersed by means of ultrasound. The vessel is closed and the suspension is stirred for another 2.5 h. Subsequently, the phosphor particles which are now blue in color are centrifuged off, washed several times with, in succession, 0.1-molar hydrochloric acid, alcohol and water, and then dried to constant weight.

To oxidize the coating, the phosphor composition is applied in the form of a thin layer in a ventilated muffle furnace. Said phosphor composition is heated to 450° C. at a rate of 200° C./h, maintained at 450° C. for 1 h and then cooled according to the natural furnace curve.

Exemplary Embodiment 4

A quantity of 242 g sodium molybdate and 15 g phosphoric acid (40%) are dissolved in 10 1 0.5-molar hydrochloric acid. A quantity of 1000 g ZnS:Cu phosphor are stirred into this solution and ultrasonically dispersed. The suspension is stirred for several hours at 50° C., whereafter it is centrifuged off and washed with, in succession, 0.1-molar hydrochloric acid, a 1:1 mixture of alcohol and water, and subsequently dried.

The powder is oxidized in the same manner as described in exemplary embodiment 1.

Exemplary Embodiment 5
(covering layer comprising $SiO_2$)

A quantity of 1000 g phosphor in accordance with exemplary embodiments 1 to 4 are stirred into 7.5 litres of a 1:1 mixture of water and acetone, and 20 ml of a colloidal silicic acid solution (Ludox® AS-40, Dupont, 40% in water relative to $SiO_2$) are added to the suspension. The pH-value of the suspension should be approximately 6 and, if necessary, is readjusted by means of $H_2SO_4$. Next, the suspension is stirred for 12 hours.

Subsequently, the suspension is filtered, the phosphor is washed with a 1:1 mixture of water and acetone, and finally dried.

Exemplary Embodiment 6
(phosphor with pigment coating)

A quantity of 1000 g of blue-luminescing ZnS:Ag phosphor, coated in accordance with exemplary embodiments 1 to 5, are suspended in 5000 ml water at a pH-value of 7.

A quantity of 200 g $CoAl_2O_4$ pigment are suspended in 500 ml water, whereafter the pigment suspension and grinding balls of yttrium-stabilized $ZrO_2$ are introduced into an agitating ball mill. After grinding for two hours at 750 U/min, 25 ml of the pigment suspension are added to the phosphor suspension. Immediately after that, a solution of 40 g of a latex (Neocryl A550®, ICI, 40% in water) in 560 ml water are added to the suspension and stirred for one hour. Subsequently, the coating reaction is initiated by adding 500 ml 1-molar $NH_4NO_3$ solution.

The suspension is then filtered, the phosphor washed with a 1:1 mixture of water and ethanol and, finally, dried at 50° C. for 24 hours.

Exemplary Embodiment 7
(phosphor with pigment coating)

A quantity of 1000 g of red-luminescing ZnCdS:Ag phosphor, coated in accordance with exemplary embodiments 1 to 5, are suspended in 5000 ml water at a pH-value of 7.

A quantity of 200 g of red $Fe_2O_3$ pigment are suspended in 500 ml water, whereafter the pigment suspension and grinding balls of yttrium-stabilized $ZrO_2$ are introduced into an agitating ball mill. After grinding for 2 hours at 750 U/min, 25 ml of said pigment suspension are added to the phosphor suspension.

Immediately after that, a solution of 40 g of a latex (Neocryl A550®, ICI, 40% in water) in 560 ml water are added to the suspension and stirred for one hour.

Subsequently, the coating reaction is initiated by adding 500 ml 1-molar $NH_4NO_3$ solution.

The suspension is then filtered, the phosphor washed with a 1:1 mixture of water and ethanol and, finally, dried at 50° C. for 24 hours.

Exemplary Embodiment 8

The coated phosphor compositions in accordance with exemplary embodiments 1 to 7, are used to manufacture a flat-panel display screen for a colour display tube.

To this end, a thin light-sensitive layer which becomes sticky upon exposure is provided on the inside of the display screen and dried. Subsequently, this layer is exposed through a shadow mask and the exposed, sticky picture elements are toned with a phosphor composition in accordance with exemplary embodiment 2. In a second and third exposure step, other areas of the light-sensitive layer are toned with the phosphor compositions in accordance with exemplary embodiments 1 and 3. Subsequently, said light-sensitive layer is burned-out at a temperature >400° C. A display screen having three phosphor compositions in the colours red, blue and green, which are not provided with a stabilizing coating, is manufactured in the same manner and serves as a standard.

These display screens are subjected to an accelerated life test (ALT) as regards picture brightness and colour reproduction in relation to the radiant energy of 4 kV radiation launched into said display screens.

The efficiency I/Io of the display screen which serves as a standard decreases substantially in the beginning and finally remains constant at a level of 20% of the starting value, however, the picture brightness of the display screen comprising the phosphors in accordance with the invention decreases only little and remains constant at approximately 80% of the starting value.

We claim:

1. A display screen comprising a sulfide and/or selenide containing phosphor particles of which phosphor are provided, directly on their surfaces, with a 0.001–0.2 μm thick stabilizing protective coating consisting essentially of stoichiometric molybdenum (VI) trioxide non-reactive with said phosphor.

2. A display screen of claim 1 wherein a covering coating comprising a dispersing aid is provided on the protective coating consisting essentially of molybdenum (VI) trioxide.

3. A display screen of claim 2 wherein a second covering coating comprising a pigment is provided on the covering coating comprising a dispersing aid.

4. A display screen of claim 1 wherein a covering coating comprising a pigment is provided on the protective coating consisting essentially of molybdenum(VI) trioxide.

* * * * *